US008639262B2

(12) United States Patent
Holcman (10) Patent No.: US 8,639,262 B2
(45) Date of Patent: Jan. 28, 2014

(54) METHOD AND APPARATUS TO CONFIRM MOBILE EQUIPMENT HAS REMAINED RELATIVELY STATIONARY USING ONE OR MORE PILOT SIGNAL

(75) Inventor: Alejandro R. Holcman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 778 days.

(21) Appl. No.: 12/262,923

(22) Filed: Oct. 31, 2008

(65) Prior Publication Data

US 2010/0113061 A1    May 6, 2010

(51) Int. Cl.
*H04W 24/00* (2009.01)
(52) U.S. Cl.
USPC ............ 455/456.1; 455/456.3; 455/456.5; 455/456.6; 455/513
(58) Field of Classification Search
USPC .......... 455/440, 456.1, 456.2, 456.5, 456.6, 455/404.2, 456.3, 513; 370/332
See application file for complete search history.

(56) References Cited

U.S. PATENT DOCUMENTS

| | | | | |
|---|---|---|---|---|
| 5,476,488 A * | 12/1995 | Morgan et al. | ................... | 607/30 |
| 5,513,246 A * | 4/1996 | Jonsson et al. | ................ | 455/443 |
| 5,943,610 A * | 8/1999 | Endo | ............................. | 455/69 |
| 6,216,004 B1 * | 4/2001 | Tiedemann et al. | .......... | 455/442 |
| 6,697,016 B1 * | 2/2004 | Voor et al. | ................ | 342/357.62 |
| 6,975,941 B1 | 12/2005 | Lau et al. | | |
| 2004/0203885 A1 * | 10/2004 | Quaid | ........................ | 455/456.1 |
| 2005/0054350 A1 | 3/2005 | Zegelin | | |
| 2007/0229355 A1 * | 10/2007 | Han et al. | ...................... | 342/419 |
| 2008/0096579 A1 | 4/2008 | Gill | | |

FOREIGN PATENT DOCUMENTS

| | | |
|---|---|---|
| FR | 2915343 | 10/2008 |
| GB | 2428164 | 1/2007 |
| JP | 2002142246 A | 5/2002 |
| WO | WO2005020497 | 3/2005 |

OTHER PUBLICATIONS

International Search Report & Written Opinion—PCT/US2009/062696, International Search Authority—European Patent Office—Apr. 7, 2010.
Taiwan Search Report—TW098137055—TIPO—Oct. 23, 2012.

* cited by examiner

*Primary Examiner* — Wesley Kim
*Assistant Examiner* — Dinh P Nguyen
(74) *Attorney, Agent, or Firm* — Kristine U. Ekwueme (57) ABSTRACT

A tracking unit operably coupled to mobile equipment is provided. The tracking unit is capable of using a pilot channel for CDMA networks, a broadcast channel for GSM networks or the like, to determine that the tracking unit has remained relatively stationary. The tracking unit determines it has remained relatively stationary by determining that it is receiving the same radio frequency signals at approximately the same strength as it previously received.

32 Claims, 5 Drawing Sheets

| Pilot PN | Time of day | Pilot Strength | Lat/Long |
|---|---|---|---|
| Base Station 1 | 2:00 AM<br>11:00 AM<br>5:00 PM | ABC dB<br>DEF dB<br>GHI dB | a/b<br>c/d |
| Base Station 2 | 2:00 AM<br>11:00 AM<br>5:00 PM | JKL dB<br>MNO dB<br>PQR dB | |
| Base Station 3 | 2:00 AM<br>11:00 AM<br>5:00 PM | STU dB<br>VWX dB<br>YZ dB | |

METHOD AND APPARATUS TO CONFIRM MOBILE EQUIPMENT HAS REMAINED RELATIVELY STATIONARY USING ONE OR MORE PILOT SIGNAL

CLAIM OF PRIORITY UNDER 35 U.S.C. §§119, 120

None.

REFERENCE TO CO-PENDING APPLICATIONS FOR PATENT

None.

BACKGROUND

1. Field

The technology of the present application relates generally to confirming mobile equipment has remained relatively stationary, and more specifically to using repeatable radio frequency signals, such as a CDMA network pilot channel, to determine whether mobile equipment has remained relatively stationary.

2. Background

The ability to identify or determine the location of mobile, wireless devices; mobile, wireless terminals; or other mobile, wireless equipment (hereinafter generally referred to as mobile equipment or ME) is becoming ubiquitous. The location of mobile equipment may be determined or estimated using a number of techniques, as are generally known in the industry, using one or more of a number of networks, including, for example, private and public networks, a WLAN, a WWAN, WiFi, WiMax, or the like. The communication protocols may include, for example, Code Division Multiple Access (CDMA) network protocols, Global System for Mobile Communications (GSM) network protocols, Universal Mobile Telecommunication System (UMTS), Time Division Multiple Access (TDMA) network protocols, Single-Carrier Frequency Division Multiple Access (SC-FDMA) network protocols, or the like. Additionally, the location or position information may be either a satellite based positioning system, a terrestrial based positioning system, or a hybrid positioning system as is generally known in the art. For example, a satellite based positioning system (SPS) may employ the Global Positioning System (GPS—was originally titled NAVSTAR when developed by the military). Of course, GPS is simply one example of an SPS and other SPSs may be used, such as, for example, other Global Navigation Satellite Systems (GNSS), Galileo positioning system (Europe), Glonass (Russian), Compass/Beidou (Chinese), QZSS (Japanese), a combination thereof, and the like.

According to one exemplary system, the mobile equipment may estimate its position or location based in part on signals received from satellites associated with a SPS, such as the United States' GPS system. Mobile equipment may be configured to communication with a mobile positioning center and/or position determining equipment through an uplink portion of a wireless network and an associated base station to request assistance concerning determining its location. In response to the request, the mobile positioning center and/or positioning determining equipment may transmit the requested information to the mobile equipment through a downlink portion of the wireless network and associated base station. Such requested information may include, for example, identification of satellites currently in view and from which the mobile equipment may be able to receive information regarding the location of the in-view satellites, correction factors, information regarding the Doppler shift to be expected, and the like as is generally known in the art. Transmitting, receiving, and processing the information, acquiring the satellite signals, determining the location, and the like require a significant amount of power that reduces the amount of time the mobile equipment may operate between recharges, new batteries, or the like.

Some mobile equipment, however, remains relatively stationary for a period of time. Tracking this mobile equipment can be valuable even though it is relatively stationary to detect, for example, unauthorized use, theft, or the like. Detecting the position of this mobile equipment, however, requires a conventional location determination even though the mobile equipment is known to be relatively stationary.

There is, therefore, a need in the art for methods and apparatuses to provide information regarding the location of a device or information regarding a device has not moved that uses less power then conventional location determination methods and apparatuses.

SUMMARY

Embodiments disclosed herein address the above stated need by storing a first strength of a radio frequency signal previously received by a tracking unit of the mobile equipment and subsequently receiving at the mobile equipment the radio frequency signal. The strength of the subsequently received radio frequency signal is calculated and compared to the first strength. It is determined that the mobile equipment is substantially at a previously determined location if the second strength is with a predetermined tolerance of the first strength, whereby it can be determined that the mobile equipment has been relatively stationary without performing a location determination.

Other embodiments disclosed herein address the above stated need by using received radio frequency signals to determine whether mobile equipment has remained relatively stationary. The method comprises receiving at the mobile equipment at least one repetitive radio frequency signal and establishing a database comprising information of previously received repetitive radio frequency signals received at the mobile equipment. The information comprising an identifier for each previously received repetitive radio frequency signal and a strength for each previously received repetitive radio frequency signal. The identifier may be a pilot PN and the strength may be a pilot strength. The method further compares information of a currently received repetitive radio frequency signal to information in the database of previously received repetitive radio frequency signals to determine whether the mobile equipment is approximately in the same location and updates the information in the database with the information from the currently received repetitive radio frequency signal.

Still other embodiments herein address the above stated need by providing a tracking unit operably coupled to mobile equipment to determine whether the mobile equipment has been relatively stationary. The tracking unit may be coupled with, integrated with, or the like with the mobile equipment and includes a wireless receiver operable to receive current radio frequency transmissions. A controller is operably coupled to the wireless receiver to extract information from the current radio frequency transmissions, which information comprising an identifier for each of the radio frequency transmissions and a strength for each of the radio frequency transmissions. A memory stores the information of previously received radio frequency transmissions. The controller is operable to compare the information of the current radio frequency transmissions to the previously received radio frequency transmissions to determine that the mobile equipment has remained relatively stationary.

Yet other embodiments herein address the above stated need by providing a computer program product containing computer executable code stored on a computer readable storage medium that cause a computer to perform operations. In particular, the executable code causes a computer to receive current radio frequency transmissions, extract information from the current radio frequency transmissions, the information comprising an identifier for each of the radio frequency transmissions and a strength for each of the radio frequency transmissions; store the information of previously received radio frequency transmissions; and compare the information of the current radio frequency transmissions to the previously received radio frequency transmissions to determine that the mobile equipment has remained relatively stationary.

In yet other embodiments herein, the above stated need is addressed by providing a tracking unit to receive radio frequency signals to determine whether mobile equipment has remained relatively stationary. The tracking unit comprising includes means for storing a first strength of a radio frequency signal previously received by a tracking unit of the mobile equipment. The tracking unit further comprises means for receiving at the mobile equipment the radio frequency signal and means for calculating a second strength of the received radio frequency signal received subsequent to storing the first strength. The tracking unit has means for comparing the second strength to the first strength and means to means for determining that the mobile equipment is substantially at a previously determined location if the second strength is with a predetermined range of the first strength, whereby it can be determined that the mobile equipment has been relatively stationary without performing a location determination.

DETAILED DESCRIPTION

The technology of the present application will now be explained with reference to illustrative embodiments. However, it should be understood that the technology of the present application is not limited to the illustrative embodiments. In particular, the technology of the present application recognizes the need and desire to track mobile equipment in a manner that is efficient and conserves energy or battery life of the mobile equipment. In many instances, the mobile equipment may be relatively stationary for a long period of time. Being relatively stationary does not entail that the mobile equipment remains in a fixed location, but rather should be broadly construed to mean movement is confined to a particular area or locale. If the mobile equipment was to remain completely stationary (i.e., no movement whatsoever), the mobile equipment may be considered to be in the same location as previously determined until, for example, a motion sensor indicates any movement. The present technology, however, is more concerned about knowing that the mobile equipment remains within a predefined or preconfigured area. For example, an expensive piece of equipment that does not move once on site may be determined to be on location once set until the motion sensor indicates motion whereas a dog, for example, may move consistently in a yard, but one would only want to be alerted if the dog moves beyond the yard. A geofence is but one example of an application in which mobile equipment, such as the dog, is determined to be within a boundary based on establishing the boundary limits and via location determination establishing the mobile equipment is within the boundary. While the technology of the present application may be explained with reference to a geofence in some embodiments herein, one of skill in the art would now understand by reading the disclosure herein that the technology of the present application is not limited to geofence applications.

Figure 1:
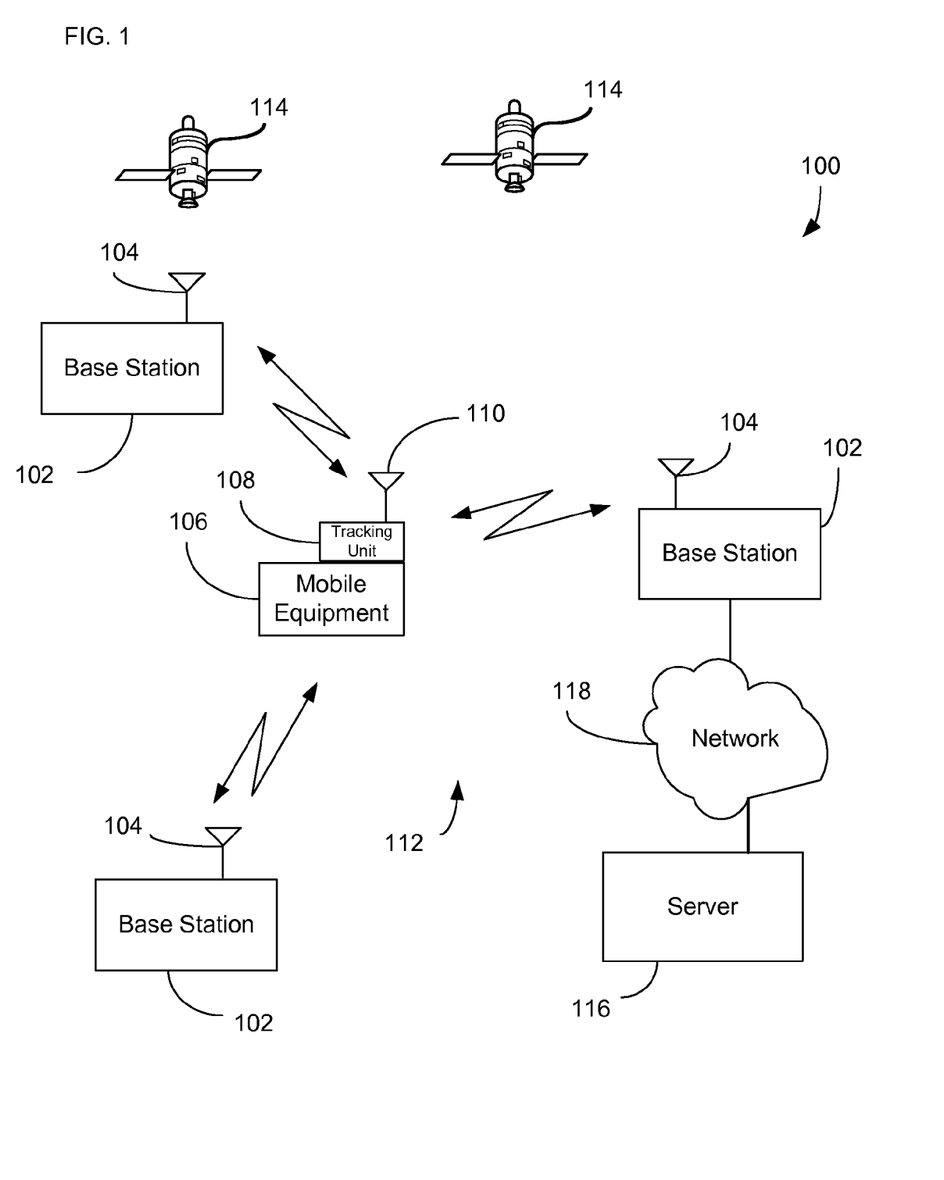
FIG. 1 is a functional block diagram illustrating one possible exemplary embodiment of a system in accordance with the technology of the present application.

Referring now to FIG. 1, an exemplary block diagram of a mobile equipment tracking network 100 is provided. Mobile equipment tracking network 100 includes one or more base stations 102 having antennas 104 and at least one mobile equipment 106. Base station 102 conventionally would include other components of system 100 that are not shown for convenience and simplicity, such other components include a base transceiver station (BTS), a base station controller (BSC), a mobile switching center (MSC), and the like as are generally known in the art. Mobile equipment 106 includes a tracking unit 108 connected to an antenna 110. As is common in the art, tracking unit 108 may include wireless communication components that are used to transmit information through a wireless communication network 112 to the antenna 104 associated with one of the base station 102. Tracking unit 108 is typically coupled to mobile equipment 106 by fixing the tracking unit 108 to mobile equipment 106, integrating the tracking unit 108 into the mobile equipment 106, or implanting the tracking unit 108 into the mobile equipment. For example, if the mobile equipment is a container, tracking unit 108 may be affixed to the external surface of the container. If mobile equipment is a pet, the tracking unit may be integrated into the collar and fixed to the pet. If the mobile equipment is a cellular telephone or radio frequency identification unit, the tracking unit 108 may be integrated into the mobile equipment 106. These are but a few examples of coupling the tracking unit 108 to the associated mobile equipment 106.

Tracking unit 108 contains one or more position sensing receivers that are capable of providing the location of the tracking unit 108, and, thus, also provide the location of the associated mobile equipment 106. In the exemplary mobile equipment tracking network 100 shown, the position sensing receivers of tracking unit 108 include satellite signal receivers, such as the GPS receivers, that receive signals from a plurality of satellites 114. As is generally understood in the art, a satellite receiver operates to provide location information to a relatively high degree of accuracy by performing well known location determination algorithms based on signals from satellites 114. Other mobile equipment tracking networks 100 may use terrestrial based tracking signals or a combination of terrestrial and satellite signals.

Tracking unit 108 may connect to a server 116, such as a mobile positioning center or the like via a conventional private or public network 118, such as any of the private and public networks mentioned above or the like. Thus, in one exemplary embodiment, tracking unit 108 may determine the location of mobile equipment 106 based in part on signals received from satellites 114 associated with GPS, or any satellite positioning system as mentioned above. Tracking unit 108 may be configured to communicate with server 116, such as a mobile positioning center, position determining equipment, or the like, through an uplink portion of mobile equipment tracking network 100 and the associated base station 102 to request assistance concerning its location. Server 116 may transmit the requested information to the tracking unit 108 through a downlink portion of mobile equipment tracking network 100 and the associated base station 102. In one exemplary embodiment, such a downlink portion may include pilot channels providing beacon functionality for initial system acquisition, synchronization channels for carrying system parameters required at system acquisition, paging channels used to carry overhead messages, pages, setup messages and orders. Information transmitted to tracking unit 108 in a downlink portion also may include, for example, commands to control and/or configure the tracking unit 108 or the like. Other information in one exemplary embodiment may include identification of satellites currently in view and from which tracking unit 108 may be able to receive information regarding the location of the in-view satellites, correction factors, information regarding the Doppler shift to be expected, and the like as is generally known in the art. Tracking unit 108 may be capable of obtaining pseudorange measurements based on, for example, signals from satellites 114 at the device using techniques generally known in the art. The location of tracking unit 108 and the associated mobile equipment 106 may be estimated based on the pseudorange measurements obtained from the acquired satellites 114. Alternatively to estimating its location, tracking unit 108 may transmit through an uplink via mobile equipment tracking network 100 and base station 102 the pseudorange measurements to server 116 or an application service as is generally known in the art to allow an external application to determine the location of tracking unit 108 and mobile equipment 106. As can be appreciated, conventional location determination requires use of the battery to, for example, acquire and track for satellites. Thus, it is desirable to reduce the amount of battery power that is used for location determination. If, for example, the only information required is whether the mobile equipment has remained relatively stationary, less battery power may be required if a conventional location determination does not need to be performed.

While tracking unit 108 may receive satellite signals for location determination, terrestrial signals for location determination, or a combination thereof, it also is receiving other signals. Thus, a correlation between the location determination and the other signals may allow for a determination of whether the device has remained relatively stationary—i.e., if the other signals remain relatively constant, the device has remained in relatively the same location. Generally, the other signals would be radio frequency signals that are repetitive signals. Repetitive is used generically to mean the signal originates from the same transmission source.

For example, in a CDMA network, tracking unit 108 receives repetitive signals from each of the identified base stations 102, which repetitive signals are generally known as a pilot channel signal. Pilot channel, pilot channel signal, and pilot signal is used synonymously herein. The repetitive signal would be received by tracking unit 108 at a particular strength and it would be identifiable as from a particular base station. In general, the pilot channel comprises an unmodulated, direct-sequence spread spectrum signal transmitted continuously by each CDMA base station 102. The pilot channel allows a mobile station to acquire the timing of the Forward CDMA Channel, provides a phase reference for coherent demodulation, and provides a means for signal strength comparison between base stations for determining when to perform a handoff between base stations 102. The identification of the pilot channel is conventionally called a Pilot PN sequence that is a pair of modified maximal length pseudonoise codes used to spread the Forward CDMA Channel and the Reverse CDMA Channel. Different base stations are identified by different pilot PN sequence offsets. The Pilot signal for each base station 102 also would be received at a particular strength by tracking unit 108. The pilot strength is the ratio of the received pilot energy to the overall received energy. Similar signals exist for other wireless networks, such as, for example, a broadcast channel (BCCH) for the GSM protocol networks, a common pilot channel (CPICH) for the UMTS protocol networks, or the like. For mobile equipment 106 that is reasonably stationary, the tracking unit 108 should, for any given time of day, receive a similar strength signal from each of the base stations 102. Because the pilot channel already has an associated identification portion, is relatively constant from particular bases stations, and is always broadcast, it is particularly well suited to be used as a proxy for relative movement. In other words, if the tracking unit receives signals from the same base stations at the same strength (or within a certain tolerance), the tracking unit is probably in the same position as the previous location determination. Thus, instead of re-performing the location determination, it is simply assumed the tracking unit is in the same position.

To calculate the relative movement, the algorithms (as explained herein) may use signals from the same base stations, or may combine signals from other or multiple base stations to arrive at a relative movement decision. These base stations may have been detected by or transmitted signals to the mobile equipment, or they may be pre-configured in the device, or a combination thereof. For example, if we refer back to the dog example above, the dog will be contained in a known location that receives signals from known base stations. These known base stations may be pre-configured to perform the relative movement calculations.

In one particular embodiment, it would be possible for the mobile equipment 106, tracking unit 108, server 116, or the like to compare the signal strength of each pilot signal to a previously recorded pilot signal strength from the same base station 102 to determine that the mobile equipment 106 must be reasonably close to where it was previously located. If a determination that the mobile equipment is relatively close to where it was previously, it is possible to avoid the need to perform the location determination, which may conserve resources of the mobile equipment 106 and tracking unit 108. The more base stations 102 that provide pilot signals to tracking unit 108, the higher degree of accuracy is obtainable. Strength of signal is particularly well suited for use as a proxy as the strength of the radio frequency signal varies in proportion to the distance from the transmitter.

Figure 2:
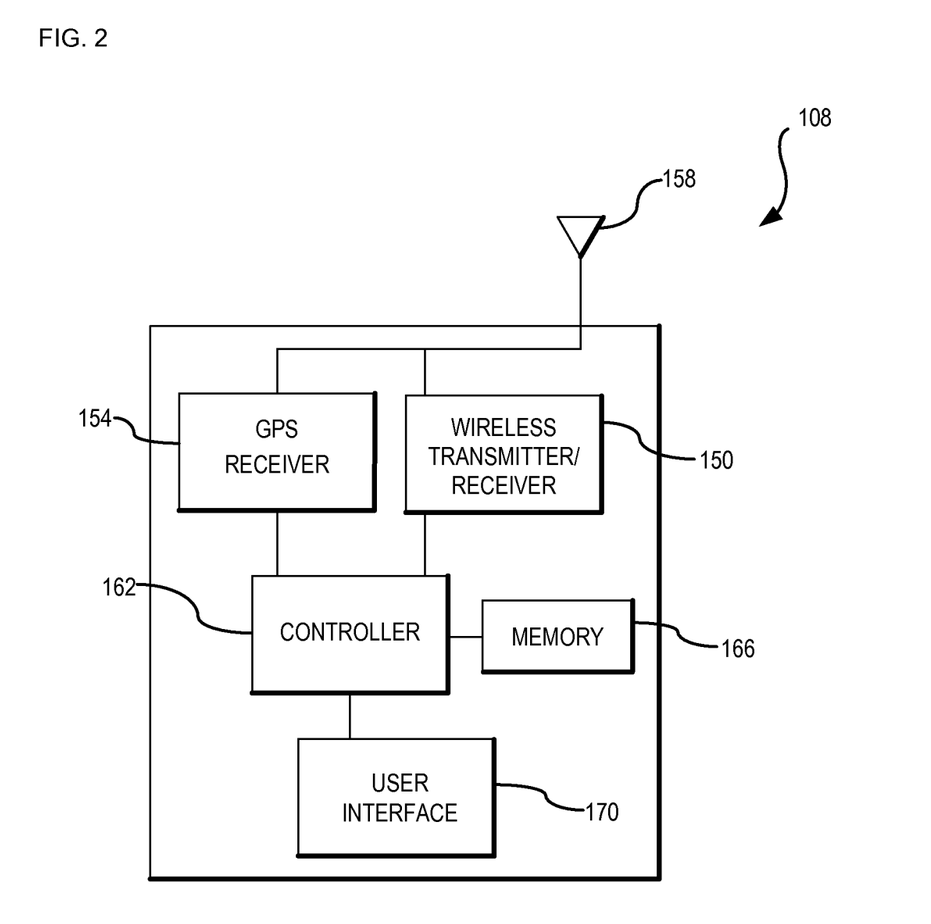
FIG. 2 is a functional block diagram illustrating one possible exemplary embodiment of a tracking unit from FIG. 1.

Referring now to FIG. 2, an exemplary embodiment of tracking unit 108 is provided. In this embodiment, the tracking unit 108 includes circuitry and components that are typical of many such devices. The device includes a wireless transmitter/receiver 150, a GPS receiver 154 and an antenna 158. The wireless transmitter/receiver 150 is operable to receive wireless signals that are received at antenna 158 and demodulate the signals and provide them to a controller 162.

The controller 162 may be any suitable controller such as a processor, microprocessor, chipset, programmable array, server, computer or the like. The wireless transceiver 150 may also receive signals from the controller 162, modulate the signals onto an RF signal and transmit the modulated signal over the antenna 158. The GPS receiver 154 is operable to receive a GPS signal from an appropriate number of GPS satellites to determine location of the tracking unit 108. The GPS receiver 154 also is connected to antenna 158. Antenna 158, while illustrated as a single antenna, may include one or more separate antennas, such as a separate antenna for the GPS receiver, a send antenna, and/or a receive antenna. The controller 162 is coupled to a memory 166 and an optional user interface 170. The controller 162 controls operations of the tracking unit 108 including operating any applications that are running on the tracking unit 108. The memory 166 may include any type of memory suitable for such a tracking unit 108 including volatile and/or non-volatile memory. The memory 166 includes code to run the different applications for the tracking unit 108. The optional user interface 170 may be any appropriate user interface including a visual and/or graphical user interface and associated keypad and/or any other physical input device. The memory 166, as will be explained further below, may be used to store pilot PN and pilot strength for each pilot channel received by tracking unit 108. However, while described as a local or co-located memory, memory may be located remote from tracking unit 108. While tracking unit 108 as shown and described includes the GPS receiver 154, one of ordinary skill in the art would recognize that tracking unit 108 may use any of the SPS described above. Moreover, tracking unit 108 may use assisted GPS, terrestrial based location systems, hybrid systems, combinations thereof, or the like.

As will be explained further below, base stations 102 may broadcast the pilot channel at different strengths at different times of day and/or tracking unit 108 may receive the plot channel having different strengths at different times of day. The changes could be because base station 102 transmission power varies over the day, or due to interference, such as, for example, multi-path, interference from other users, atmospheric conditions, seasonal issue, or the like. Thus, the signal strength should be compared to signal strengths obtained during similar periods of time. Moreover, while the present network 100 is shown with three base stations providing signals to tracking unit 108, the technology of the present application could similarly work with as many base stations 102 as are available or a single base station 102, although the accuracy using a single base station 102 may be compromised depending on the movement trajectory of the mobile equipment 106.

Figure 3:
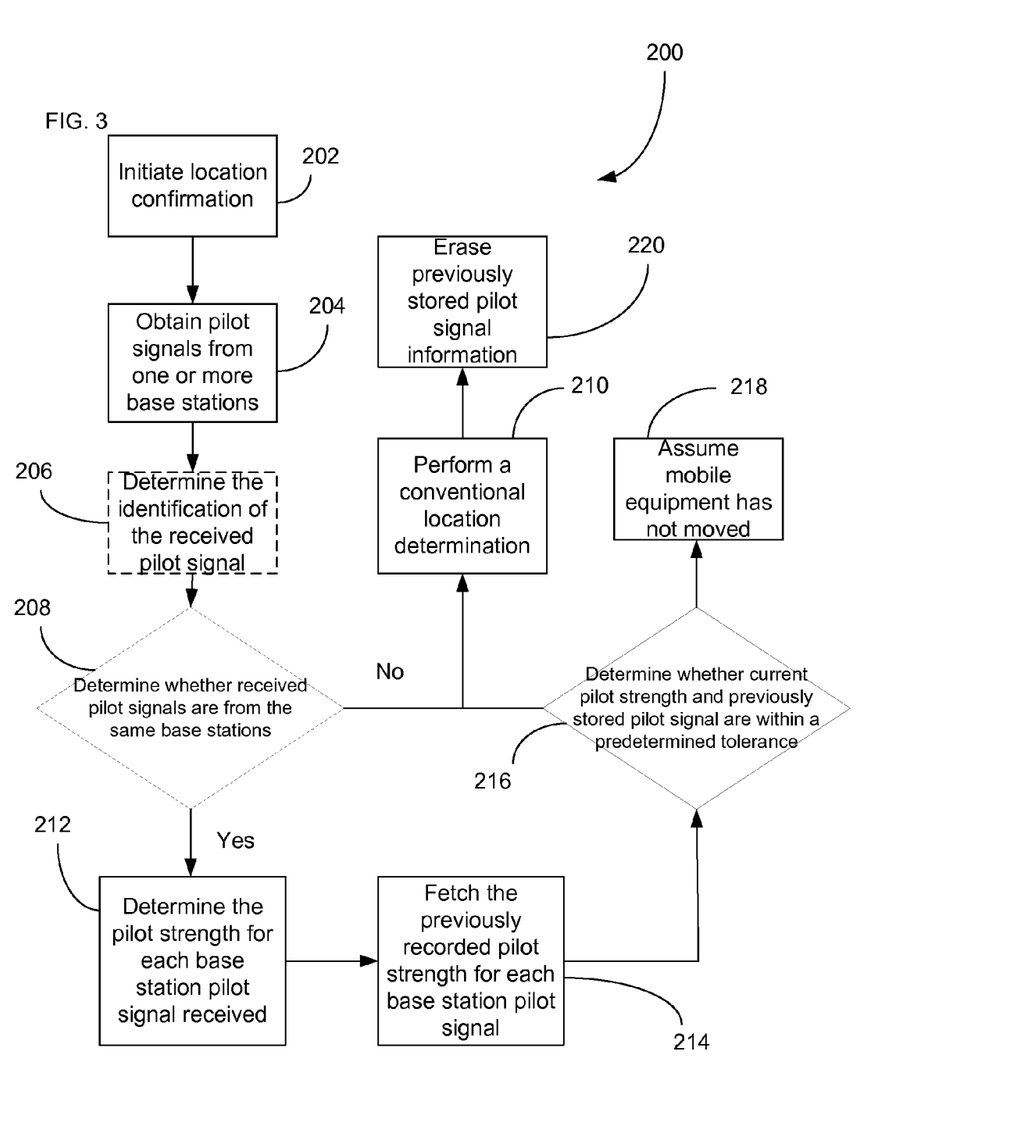
FIG. 3 is an exemplary flowchart illustration of operational steps associated with the technology of the present application.

Referring now to FIG. 3, an exemplary flowchart 200 illustrating operational steps associated with the technology of the present application is provided. The flowchart 200 describes an exemplary embodiment where previously received stored pilot PN and pilot strength are stored, the receiving and storing previous pilot PN and pilot strength is explained further below. Moreover, the associated steps are provided as discrete steps in a particular order but it should be understood that various steps may occur iteratively, continuously, or the like. The steps as provided also may be combined with other steps and performed in different orders.

In the exemplary flowchart 200, first, at step 202, a location confirmation process would be initiated. Once initiated tracking unit 108 would receive pilot channel signals from one or more base stations 102, step 204. In actuality, as the pilot channel is continually broadcast, the tracking unit 108 continually receives the pilot channels, but the pilot channels may be ignored for present purposes except when either confirming location or storing information. The initiation of the confirmation of location may be accomplished manually by a user, automatically by the device at random or predefined intervals, application based, or the like. Moreover, the reception of pilot channel signals could depend on whether the tracking unit 108 was continuously on, had a duty cycle, or the like. Optionally, a check could be made to determine whether the pilot channel signals from one or more base stations are from the same base stations as previously received. This optional check is shown as steps 206 and 208 in phantom in flowchart 200. First, the identification of the received pilot signals is determined from the pilot PN, step 206. Next it is determined whether the identification of the received pilot signals match the identification of previous pilot signals, step 208. Of course, instead of checking that signals are received from identical base stations, the system could assume the base stations are the same. In this exemplary embodiment, determining whether the received pilot signals are from the same base station involves determining whether each of the received pilot PNs are identical to the stored pilot PNs. If all the received pilot signals do not match the identification of the previous pilot signals, then, at step 210, a conventional location determination is performed as it would be concluded the mobile equipment has moved; otherwise it would see the same base stations 102. All the received pilot signals may not match if the tracking unit 108 is receiving more, less, or simply different pilot signals than previously received.

Next, the pilot signal strength for each base station pilot signal is determined, step 212. The previously stored pilot signal strength for each pilot signal is fetched from a memory, step 214. As explained below, the previously stored pilot signal strength may be the last received or calculated strength, the average strength over time, a weighted average strength over time, a range of strength between a recorded maximum and minimum, or the like. Next, it is determined whether the pilot strength of the obtained pilot signal is within a predetermined tolerance of a previously stored pilot strength, step 216. The predetermined tolerance may be a percent change from the recorded strength, or the like. The tolerance would largely be determined on how much movement variation would be allowable for the particular application. If the pilot strength for each of the received pilot signals is within the predetermined threshold, it is assumed the mobile equipment has not moved outside of the allowed location, step 218, until the next location confirmation initiation, step 202. If the pilot strength for each of the obtained pilot signals is outside the predetermined threshold, a conventional location determination is performed as it is assumed the mobile equipment moved, step 210. If a conventional location determination is performed, the previously stored pilot channel information should be erased, step 220.

During the initial deployment of the technology, and from time to time, even when technology of the present application has determined that the mobile equipment has remained relatively stationary, it may be beneficial to determine the actual position of the mobile equipment by performing a location determination. This could be performed, manually, randomly, automatically, at predefined intervals, more frequently when the mobile equipment is first deployed in the location, or the like. The actual location of the mobile device may be used to improve the accuracy of the coarse movement detector by tuning the tolerance or the like. In one exemplary embodiment, for instance, the pilot signal strength associated with several locations that are fixed using GPS position determination. Taking pilot signal strength and associating them with fixed GPS latitude and longitude locations, for example, about the perimeter of the permitted movement area, may allow fine tuning the tolerance of the pilot strengths when possible.

Notice, while the exemplary embodiment above has been described with respect to a pilot signal, a pilot signal PN, and a pilot signal strength, one of ordinary skill in the art would understand that any wireless signal obtained by tracking unit 108 may be used to determine whether mobile equipment 106 has remained relatively stationary as long as the wireless signal is reasonably consistent, unique, or predictable. In another exemplary embodiment, instead of pilot channel transmissions, the tracking unit 108 may receive radio broadcasts. For example, it may be possible to use radio tower signals in the AM or FM band for a similar location proxy. For example, if AM band radio stations are broadcasting, tracking unit 108 may be configured to obtain the AM band transmissions, which would be identifiable by the broadcast frequency and obtain the strength of the radio transmission. Moreover, radio frequency signals from airports or other generally stationary transmission sources may similarly be used. In other words, almost any radio frequency signal that the tracking unit 108 can receive may be used as a proxy for determining the tracking unit 108 is still receiving the same signals at the same relative strength allowing the conclusion that tracking unit 108 has remained relatively stationary.

As can be appreciated, once mobile equipment 106 is relatively stationary, the method of flowchart 200 may be used as a proxy for location once an initial set of information from a pilot channel or other radio frequency broadcast is obtained. The set of information may sometimes be referred to as a virtual active set, virtual set, or the like. In the case of using the pilot channel as the location proxy, the virtual set may include, for example, pilot PNs and pilot strengths.

Figure 4:
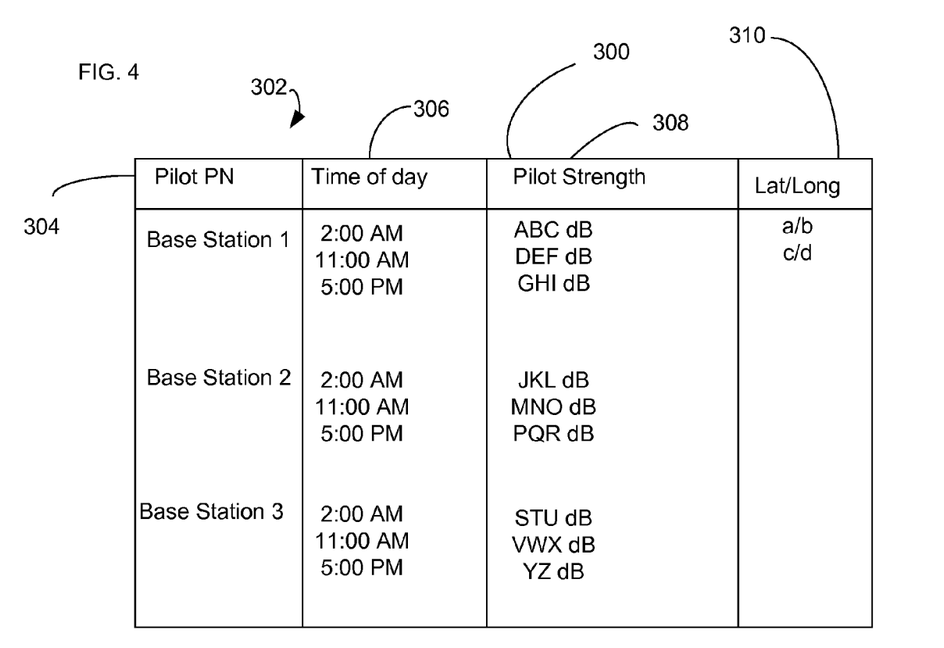
FIG. 4 is an exemplary memory associated with the technology of the present application.

It is envisioned that a database will be built over time to facilitate the operation of the system. Thus, once mobile equipment 106 is located at a site where it is expected to remain (i.e., within a relatively stationary location such as may be associated with a geofence application), tracking unit 108 begins receiving one or more pilot channel broadcasts from base stations 102 and begins building a database relating to the signals. The database may include the pilot PN which is consistent for any given base station in view, the time of day the signal is recorded, which could be any time derivation as a matter of design choice, and the pilot strength, which may vary over the course of a day. Tracking unit 108 may maintain the database in memory 166 or may locate the database remotely, such as a memory associated with the server 116. An exemplary database 300 is shown in FIG. 4. Database 300 may include a number of fields or cells 302. In this case, cells 302 include pilot PN cell 304 for base station identification, of which 3 base stations are shown, but the number of base stations would equal the number of base stations from which tracking unit 108 receives a pilot channel. Another field would be time of day cell 306 as the pilot strength and/or base station transmission power may vary over the course of a day due to, for example, expected usage or the like. Finally, another field may be the pilot strength cell 308. Thus, the expected pilot strength of base station 2 at 11:00 AM would be MNO dB. Of course, the times are exemplary and may represent any denomination such as strength by the minute, hour, several hours, or whether the day is a week day or a weekend day as well as, for example, months or the like. The pilot strength may be a single representation as shown, which could be the previously recorded pilot strength. Alternatively, the pilot strength could be a running average of pilot strengths. In still another embodiment, the maximum and minimum pilot strengths for a given time may be recorded to establish a range in which the pilot strength is expected and the tracking unit may be considered to be relatively stationary if the pilot strengths are within the tolerances of the respective ranges.

As mentioned above, actual latitude and longitude measurements also may be associated with the pilot signal strength measurement at any given time of day for any give base station. As shown in FIG. 4, database 300 may include a latitude/longitude cell 310 having associated actual positions for the measurements (as shown by a/b and c/d in the column). Actual latitudes and longitudes would not be necessary for every associated reading. These actual positions may be used as mentioned above to tune the tolerance for the technology to determine whether the mobile equipment has remained within the boundary.

Figure 5:
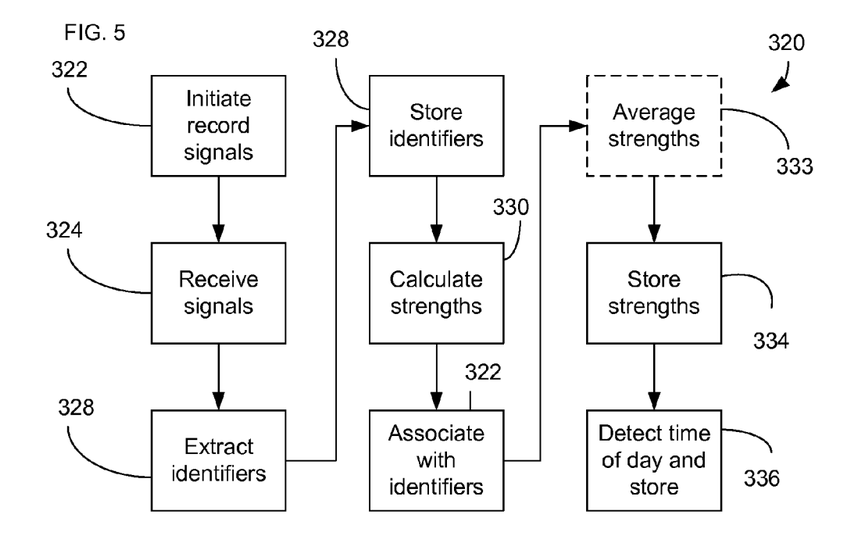
FIG. 5 is an exemplary flowchart illustration of operational steps associated with building the memory of FIG. 4.

Referring now to FIG. 5, an exemplary flowchart 320 illustrating operational steps associated with recording representative signals is provided. First, at step 322, the recording of representative signals is initiated. Next, the tracking unit 108 receives one or more radio frequency signals at the location, step 324. Tracking unit 108, or some remote processor as a matter of design choice, extracts an identifier for each of the one or more radio frequency signals received, step 326. One exemplary identifier may include the pilot PN as described above; another may include an AM/FM band; another may include a airport tower identification; yet another may include broadcast channel identification, a combination thereof, or the like. Each of the identifiers is stored in a memory, such as the memory 166 of tracking unit 108, step 328. A signal strength, such as pilot strength or some similar signal that would vary with a change in distance from the signal source, would be calculated for each of the one or more radio frequency signals, step 330. The signal strength would be associated with the corresponding identifier, step 332, and stored in the memory, such as the memory 166, step 334. Optionally, a time stamp may be detected or determined as is conventional in the art and associated with the identifier and strength of each of the received radio frequency signals, and stored in the memory, step 336.

Regarding the strength, or some similar signal that would vary with a change in location, each strength signal recorded may simply replace the previously recorded and stored signal once it is determined the tracking unit 108 and the mobile equipment 106 are considered to be in relatively the same location. Alternatively, the first recorded strength may be retained. In still another embodiment, the recorded strength may be running averages, weighted averages, or the like. Thus, step flowchart 320 may include an optional step 333 averaging the strengths. Such an averaging step may be calculated by using, for example, the following formula:

$$\text{Average Signal Strength} = (\Sigma(\text{Signal Strength})_n)/n$$

where (signal strength)n is the signal strength and n is the number of signals. Averaging the signal strength over time is but one option for providing a single value. Alternative averaging equations, such as weighted averages that may more accurately reflect atmospheric conditions by providing more weight to more recently calculated signal strengths, also may be used.

Figure 6:
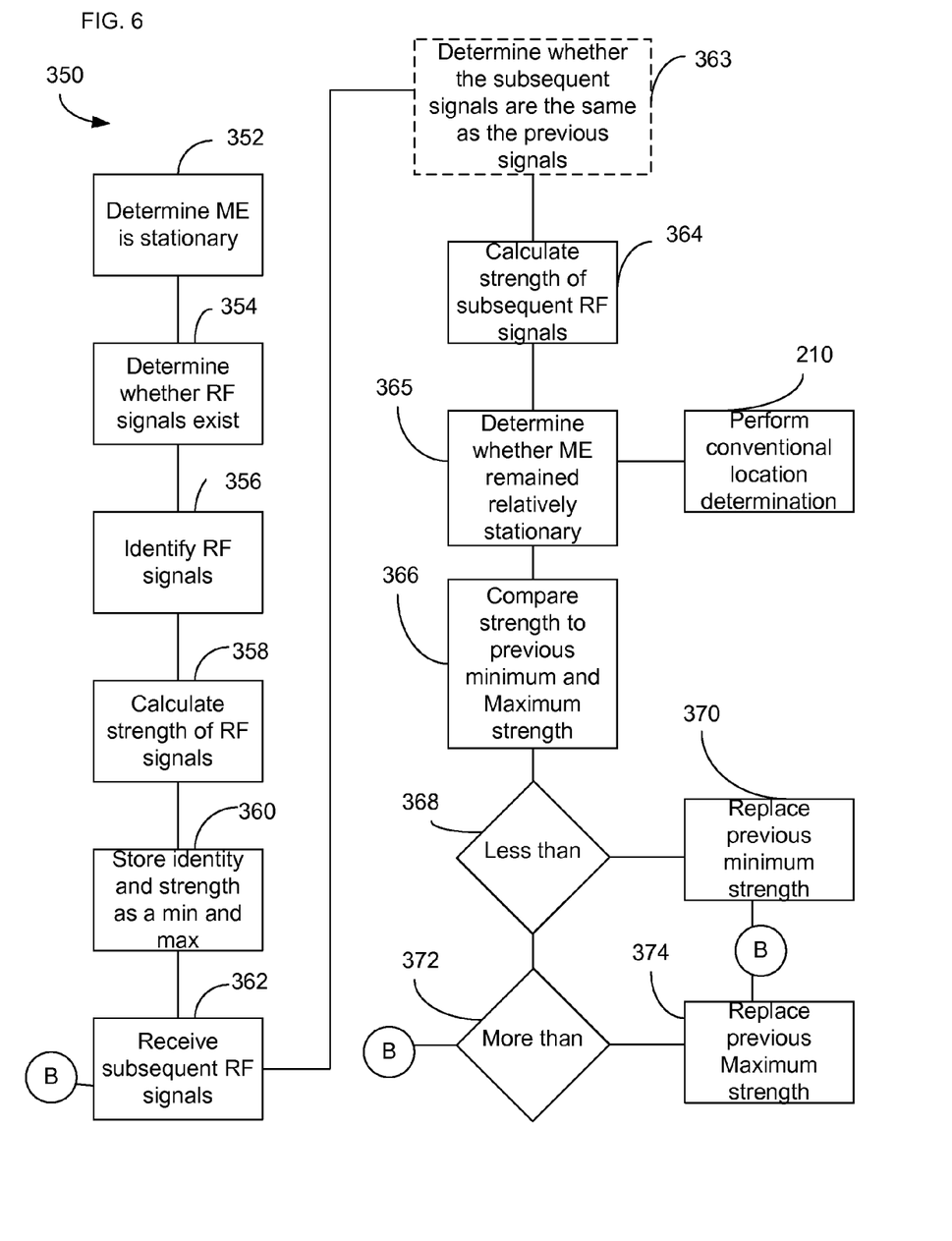
FIG. 6 is an exemplary flowchart illustration of operational steps associated with the technology of the present application.

Referring now to FIG. 6, an exemplary flowchart 350 illustrating operational steps for one possible embodiment of the technology of the present application is provided. Flowchart 350 provides one possible embodiment of operational steps to record signal strengths that can be used to determine whether the received signal strength is within a tolerance to indicate the mobile equipment 106 has remained relatively stationary. First, at step 352, the mobile equipment is determined to be relatively stationary. Determining the mobile equipment is relatively stationary may be accomplished by a manual indication from a user, consecutive location determinations indicating the mobile equipment has remained within a predetermine location, or the like. Next, at step 354, the tracking unit 108 determines whether one or more radio frequency signals exist that may be used to evaluate whether the mobile unit 106 has remained relatively stationary or within an area. If one or more radio frequency signals exist that may be used to evaluate whether the mobile unit 106 has remained relatively stationary or within the area, the tracking unit identifies the radio frequency signals, step 356, and calculates the strength of the radio frequency signals, step 358, and stores the identity and strength of each radio frequency signal, step 360. In this example, as this is the first strength for the identified signal, the strength is stored in both a minimum and maximum strength cell of the memory. For clarity, the stored minimum and maximum may be referred to as previously recorded minimum or previously recorded maximum. As can be appreciated, a time of day or the like also may be recorded similar to the operations described above. Tracking unit 108 (at the next interval, which may be set over a spectrum from continuous to intermittently, such as by minutes, hours, days or the like) receives a subsequent radio frequency signal and identifies the radio frequency signal, step 362. Optionally, tracking unit 108 may determine whether the subsequent radio frequency signals are the same as the previous radio frequency signals as previously explained, step 363 shown in phantom. Next, the strength of the subsequent radio frequency signal is calculated, step 364. It is then determined whether the mobile equipment has remained within relatively the same location, step 365; such calculation may be consistent with flowchart 200 above or the like. If it is determined the mobile equipment has moved, a conventional location determination is performed, similar to step 210, and the process returns to step 352 for when the mobile equipment is next in a relatively stationary position. If it is determined the mobile equipment has not moved, the strength of the subsequent radio frequency signal is compared to the previously recorded minimum strength signal and maximum strength signal, step 366. If the strength of the subsequent radio frequency signal is less than the previously stored minimum, the subsequent radio frequency signal is stored and becomes the previously stored minimum, step 370, and the process returns to step 362. If the strength of the subsequent radio frequency signal is not less than the previously stored minimum, it is determined if it is greater than the previously stored maximum, step 372. If it is greater than the previously stored maximum signal, the subsequent radio frequency signal is stored and becomes the previously stored maximum, step 374. Finally, control is returned to step 362 to continue determining whether the mobile equipment remains relatively stationary.

The above operational steps illustrate one possible methodology relating to providing a band in which the radio frequency signal strength should exist to determine that the mobile equipment has not moved. The actual determination may be made by determining whether the strength is no more than a predetermined amount less than the previously recorded minimum and no more than a predetermined amount more than the previously recorded maximum. Similarly, there may be a predetermined minimum signal strength to initiate the location proxy and/or location confirmation process.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps, described in connection with the embodiments disclosed herein, may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof, designed to perform the functions described herein. A general purpose processor may be a microprocessor, but in the alternative, the processor may be any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of using received radio frequency signals to determine whether a mobile equipment has remained relatively stationary, the method comprising:
storing a first strength of at least one of a plurality of pilot channel signals in a first radio frequency signal previously received by a tracking unit of the mobile equipment, wherein the plurality of pilot channel signals are broadcast by a plurality of base stations, the first strength is stored based at least on an associated pilot Pseudo Noise (PN) and detected pilot strength corresponding to the at least one of a plurality of pilot channel signals, and the first strength comprises a previous minimum signal strength and a previous maximum signal strength;
subsequently receiving at the mobile equipment a second radio frequency signal;
calculating a second strength of at least one of the plurality of pilot channel signals in the subsequently received second radio frequency signal;
comparing the second strength to the first strength based on the associated pilot PN;
upon detecting that the second strength is no less than a first amount below the previous minimum signal and no more than a second amount above the previous maximum signal, determining that the mobile equipment has been relatively stationary without performing a location determination;
obtaining an actual position of the mobile equipment; and
adjusting the first amount and the second amount based on the actual position in connection with a movement area.

2. The method of claim 1, wherein the first amount is equal to the second amount.

3. The method of claim 1, wherein the first strength comprises a previous pilot strength and the second strength comprises a current pilot strength.

4. The method of claim 3, further comprising:
storing a first pilot Pseudo Noise (PN) associated with the previous pilot strength;
determining a second pilot PN associated with the current pilot strength; and
comparing the first pilot PN to the second pilot PN to determine that the mobile equipment has remained relatively stationary when the first pilot PN equals the second pilot PN.

5. The method of claim 4, wherein the first pilot PN comprises a plurality of first pilot PNs and the second pilot PN comprises a plurality of second pilot PNs.

6. The method of claim 1 wherein the radio frequency signal comprises at least one of a broadcast channel of a Global System for Mobile Communications (GSM) network or a common pilot channel of an Universal Mobile Telecommunication System (UMTS) network.

7. The method of claim 1, further comprising calculating the first strength averaging previously recorded strengths to define an average strength.

8. The method of claim 7, wherein the average strength is a weighted average.

9. A method of using received radio frequency signals to determine whether a mobile equipment has remained relatively stationary, the method comprising:
receiving at the mobile equipment at least one repetitive radio frequency signal comprising a plurality of pilot channel signals broadcast by a plurality of base stations;
establishing a database comprising information of previously received repetitive radio frequency signals received at the mobile equipment, the information comprising an identifier for each previously received repetitive radio frequency signal and a strength for each previously received repetitive radio frequency signal, the strength comprising a previous minimum signal strength and a previous maximum signal strength, and each pilot channel signal being saved based at least on the identifier and the strength;
comparing information of a currently received repetitive radio frequency signal to information in the database of previously received repetitive radio frequency signals including:
upon detecting that the currently received repetitive radio frequency signal is no less than a first amount below the previous minimum signal and no more than a second amount above the previous maximum signal of each of the previously received repetitive radio frequency signals, determining that the mobile equipment has been relatively stationary without performing a location determination,
obtaining an actual position of the mobile equipment, and
adjusting the first amount and the second amount based on the actual position in connection with a movement area; and
updating the information in the database with the information from the currently received repetitive radio frequency signal.

10. The method of claim 9 wherein the identifier is a pilot PN and the strength is a pilot strength.

11. The method of claim 10, wherein the information in the database comprises the time of day that the pilot PN and the pilot strength are determined such that the comparison compares information from approximately the same time of day.

12. The method of claim 10, wherein the establishing the database comprises extracting from the received repetitive radio frequency signal the identifier of each pilot channel signal and calculating the strength of each pilot channel signal.

13. The method of claim 12, wherein the updating comprises averaging the information from the previously received repetitive radio frequency signals with the currently received repetitive radio frequency signal.

14. The method of claim 9, wherein the updating the information comprising comparing the currently received repetitive radio frequency signal with the previous minimum signal strength of each of the previously received repetitive radio frequency signals and replacing the previous minimum signal strength of each of the previously received repetitive radio frequency signals with the currently received repetitive radio frequency signal.

15. The method of claim 9, wherein the updating the information comprising comparing the currently received repetitive radio frequency signal with the previous maximum signal strength of each of the previously received repetitive radio frequency signals and replacing the previous maximum signal strength of each of the previously received repetitive radio frequency signals with the currently received repetitive radio frequency signal.

16. The method of claim 9 wherein the information includes at least one position determination for the previously received repetitive radio frequency signals.

17. A tracking unit operably coupled to a mobile equipment to determine whether the mobile equipment has been relatively stationary, comprising:
a wireless receiver operable to receive current radio frequency transmissions comprising a plurality of pilot channel signals broadcast by a plurality of base stations;

a controller operably coupled to the wireless receiver to extract information from the current radio frequency transmissions, the information comprising an identifier for each of the radio frequency transmissions and a strength for each of the radio frequency transmissions, the strength comprising a previous minimum signal strength and a previous maximum signal strength; and a memory to store the information of previously received radio frequency transmissions, each pilot channel signal being saved based at least on the identifier and the strength, wherein the controller is operable to compare the information of the current radio frequency transmissions to the previously received radio frequency transmissions including:

upon detecting that each of the current radio frequency transmissions is no less than a first amount below the previous minimum signal and no more than a second amount above the previous maximum signal of each of the previously received radio frequency transmissions, determining that the mobile equipment has been relatively stationary without performing a location determination, obtaining an actual position of the mobile equipment, and adjusting the first amount and the second amount based on the actual position in connection with a movement area.

18. The tracking unit of claim 17, wherein the identifier comprises a pilot PN, and the strength is pilot strength, and the controller extracts the pilot PN and the pilot strength from the pilot channel transmissions and stores the pilot PN and the pilot strength as the information.

19. The tracking unit of claim 17 wherein the wireless receiver receives at least one of broadcast channels from base stations operating under GSM or common pilot channels from base stations operating under UMTS Network.

20. The tracking unit of claim 17, further comprising a location determination sensor operably coupled to the controller to determine the location of the tracking unit.

21. The tracking unit of claim 20 wherein the location determination sensor is a Global Positioning System (GPS) receiver.

22. The tracking unit of claim 17 wherein the controller is operably coupled to the memory to erase the information if the controller determines the tracking unit moved from a previous location.

23. The tracking unit of claim 17 wherein the controller is operable to determine that the mobile equipment has remained relatively stationary after the memory stores previously received radio frequency transmissions.

24. The tracking unit of claim 17, further comprising a GPS receiver adapted to determine the position of the mobile equipment, and wherein the controller is operable to store the position of the mobile equipment in the memory and adapted to use the position of the mobile equipment to tune the ability to determine whether the mobile equipment has remained relatively stationary.

25. A computer program product containing computer executable codes stored on a non-transitory computer readable storage medium that cause a computer to:

receive current radio frequency transmissions, wherein the current radio frequency transmissions comprise a plurality of pilot channel signals broadcast by a plurality of base stations;

extract information from the current radio frequency transmissions, the information comprising an identifier for each of the radio frequency transmissions and a strength for each of the plurality of pilot channel signals, the strength comprising a previous minimum signal strength and a previous maximum signal strength; and store the information of previously received radio frequency transmissions, each pilot channel signal being saved based at least on the identifier and the strength; and compare the information of the current radio frequency transmissions to the previously received radio frequency transmissions including:

upon detecting that each of the current radio frequency transmissions is no less than a first amount below the previous minimum signal and no more than a second amount above the previous maximum signal of each of the previously received radio frequency transmissions, determining that the mobile equipment has been relatively stationary without performing a location determination, obtaining an actual position of the mobile equipment, and adjusting the first amount and the second amount based on the actual position in connection with a movement area.

26. A tracking unit to receive radio frequency signals to determine whether a mobile equipment has remained relatively stationary, the tracking unit comprising:

means for storing a first strength of at least one of a plurality of pilot channel signals in a first radio frequency signal previously received by a tracking unit of the mobile equipment, wherein the plurality of pilot channel signals are broadcast by a plurality of base stations, the first strength is stored based at least on an associated pilot Pseudo Noise (PN) and detected pilot strength corresponding to the at least one of a plurality of pilot channel signals, and the first strength comprises a previous minimum signal strength and a previous maximum signal strength;

means for receiving at the mobile equipment a second radio frequency signal;

means for calculating a second strength of at least one of the plurality of pilot channel signals in the subsequently received second radio frequency signal;

means for comparing the second strength to the first strength based on the associated pilot PN;

means for, upon detecting that the second strength is no less than a first amount below the previous minimum signal and no more than a second amount above the previous maximum signal, determining that the mobile equipment has been relatively stationary without performing a location determination;

means for obtaining an actual position of the mobile equipment; and means for adjusting the first amount and the second amount based on the actual position in connection with a movement area.

27. The method of claim 1, wherein the first amount and the second amount at least determine an allowable variation range of the movement area for the mobile equipment.

28. The method of claim 1, wherein the adjusting comprises:

calculating a third strength of a subsequently received radio frequency signal comprising the plurality of pilot channel signals; and associating the third strength with latitudes and longitudes of a plurality of determined locations near a perimeter of the movement area.

29. The method of claim 9, wherein the first amount and the second amount at least determine an allowable variation range of the movement area for the mobile equipment.

30. The method of claim 9, wherein the adjusting comprises:
- calculating a signal strength of the currently received repetitive radio frequency signal comprising the plurality of pilot channel signals; and
- associating the signal strength with latitudes and longitudes of a plurality of determined locations near a perimeter of the movement area.

31. The tracking unit of claim 17, wherein the first amount and the second amount at least determine an allowable variation range of the movement area for the mobile equipment.

32. The tracking unit of claim 17, wherein the adjusting comprises:
- calculating signal strengths of the current radio frequency transmissions comprising the plurality of pilot channel signals;
- associating the signal strengths with latitudes and longitudes of a plurality of determined locations near a perimeter of the movement area.

* * * * *